United States Patent [19]
Asada et al.

[11] Patent Number: 5,251,280
[45] Date of Patent: Oct. 5, 1993

[54] LIQUID CRYSTAL DISPLAY APPARATUS

[75] Inventors: Atsushi Asada; Toshio Ishikawa, both of Nara; Yasuo Nakata, Kashihara; Yoshio Yoshida; Yukio Kurata, both of Tenri, all of Japan

[73] Assignee: Sharp Kabushiki Kaisha, Osaka, Japan

[21] Appl. No.: 791,660

[22] Filed: Nov. 8, 1991

[30] Foreign Application Priority Data

Nov. 9, 1990 [JP] Japan ................... 2-304613
Nov. 19, 1990 [JP] Japan ................... 2-313588

[51] Int. Cl.$^5$ ........................................ G02B 6/06
[52] U.S. Cl. ............................. 385/115; 385/116; 385/121
[58] Field of Search ............ 385/115, 116, 121, 146, 385/147, 901; 359/42

[56] References Cited

U.S. PATENT DOCUMENTS

| | | | |
|---|---|---|---|
| 3,043,910 | 7/1962 | Hicks, Jr. ................ | 385/121 |
| 3,574,582 | 4/1971 | Siegmund et al. ........... | 385/121 |
| 4,026,693 | 5/1977 | Sato ........................ | 385/121 |
| 4,332,439 | 6/1982 | Lübbers et al. ............. | 385/121 |
| 4,761,062 | 8/1988 | Loce et al. ................ | 385/116 |
| 4,911,528 | 3/1990 | Polaert .................... | 385/116 |
| 4,973,128 | 11/1990 | Hodges ..................... | 385/116 |
| 5,067,792 | 11/1991 | Lloyd ...................... | 385/121 |

FOREIGN PATENT DOCUMENTS

| | | |
|---|---|---|
| 0324147 | 7/1989 | European Pat. Off. . |
| 3111743 | 10/1982 | Fed. Rep. of Germany . |
| 63-175882 | 7/1988 | Japan . |
| 63-250680 | 10/1988 | Japan . |

OTHER PUBLICATIONS

Boyd, J. T., et al., *Optical Engineering*(May/Jun. 1980) 19(3):387–391, "Optical channel waveguide arrays coupled to integration . . . ".

*Primary Examiner*—Frank Gonzalez
*Attorney, Agent, or Firm*—Morrison & Foerster

[57] ABSTRACT

A liquid crystal display apparatus which includes display devices each having screens, an optical fiber bundle connected to the respective screens so as to transmit an image therethrough, wherein the optical fiber bundle includes optical fibers arranged side by side, fastened to each other, and bent so as to have a straight portion and branch portions, the straight portion being perpendicularly connected to an output end face, and the branch portions being connected to an input end face, and spacers interposed between adjacent optical fibers in a portion of the bundle at least toward the output end face of the display apparatus.

8 Claims, 16 Drawing Sheets

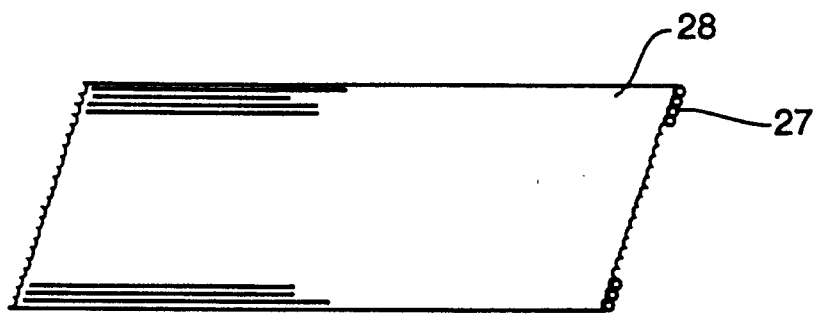
FIG. 10a
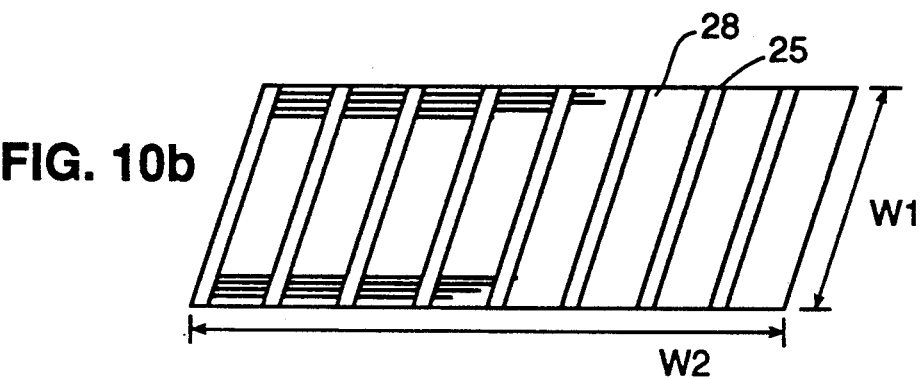
FIG. 10b
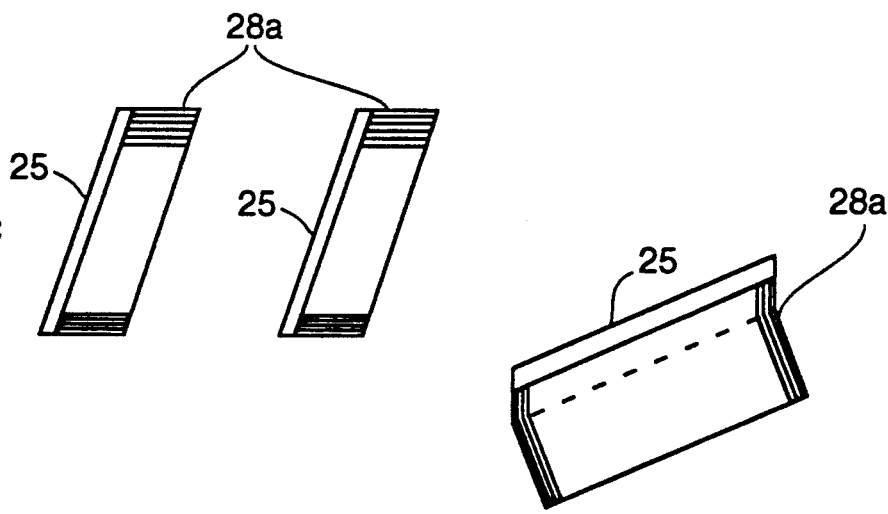
FIG. 10c
FIG. 10d
FIG. 10e
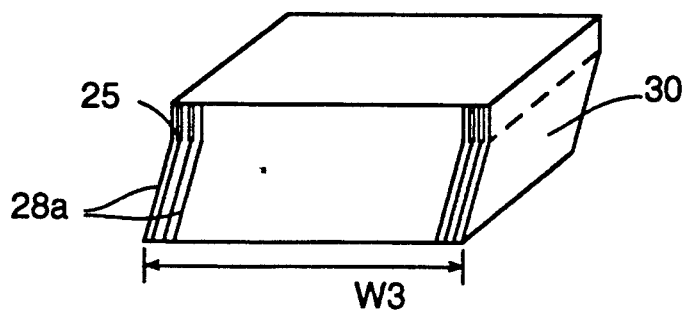

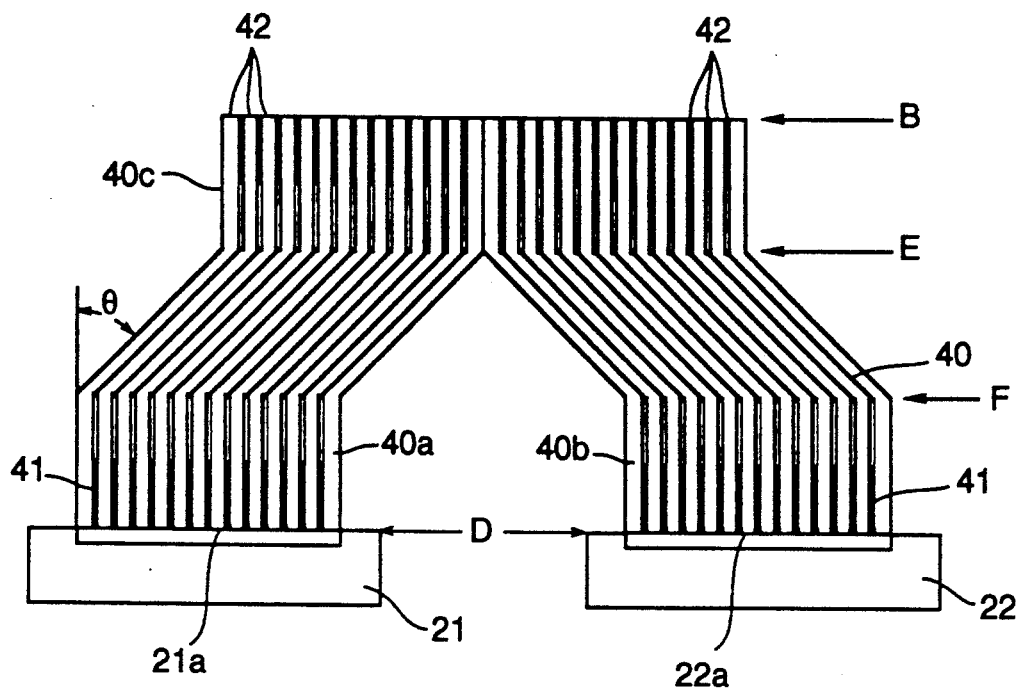
FIG. 12
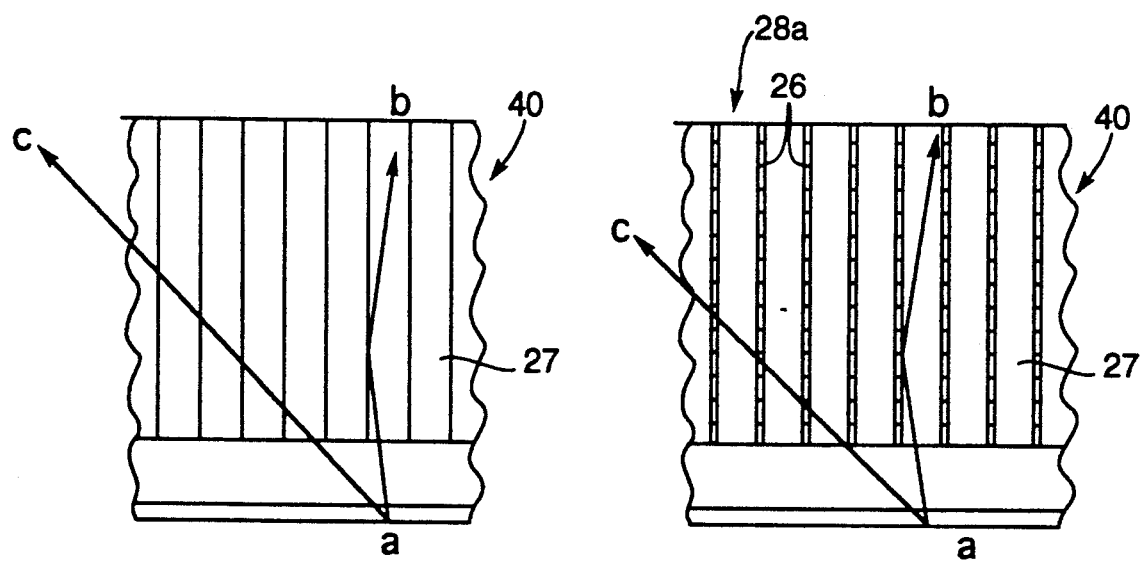
FIG. 13a  FIG. 13b

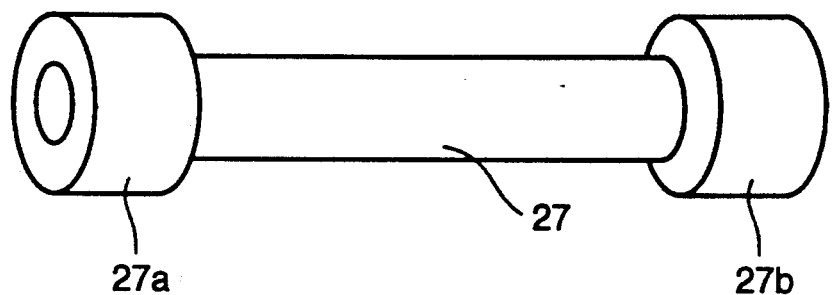
FIG. 17
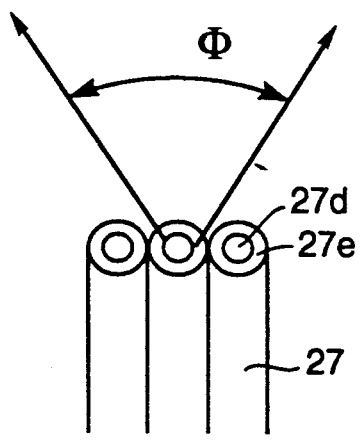 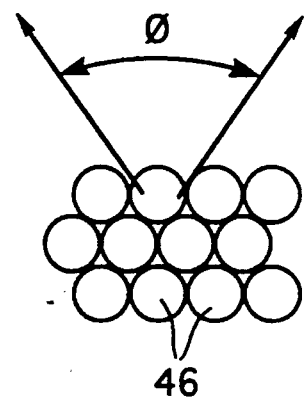
FIG. 18a  FIG. 18b

LIQUID CRYSTAL DISPLAY APPARATUS

BACKGROUND OF THE INVENTION

1. Field of the Invention:

The present invention relates to a liquid crystal display apparatus for forming a seamless composite picture from a plurality of liquid crystal display panels through optical fiber transmission.

2. Description of the Prior Art:

In recent years, a variety of display apparatus have been used, among which a liquid crystal display apparatus is becoming more popular than the conventional CRTs because of its thin structure, relatively small consumption of electricity, and versatility. However, a liquid crystal display apparatus has a disadvantage inherent to its intricate construction in which liquid crystal is confined in spaces of micron order between transmissive picture elements. The display panels are susceptible to dirt, thereby causing faulty picture elements. As the size of the display apparatus becomes large, faulty picture elements are more likely to occur. Faulty picture elements spoil the commercial value of a display apparatus. Tests show that when the size of a screen is 15 inches or more, mass production at a reasonable production costs becomes difficult.

In order to overcome this problem, a plurality of minor liquid crystal display devices, having a diameter of 15 inches or less, are arranged so as to constitute a large-size apparatus. An example is shown in FIG. 1a in which nine minor display devices 1 are arranged in a lattice (3×3). If each device 1 is a 14 inches type, the finished display apparatus will be a 42 inches size.

A small display unit like the display device 1 unavoidably has a non-image area 1b along the periphery of the screen, wherein the non-image area has no image represented. This non-image area having a width of 3 mm is unavoidably formed by a space for containing liquid crystal confined between the two opposing substrates, and a space for disposing the wiring and electrodes for applying voltage to the picture elements.

Because of the non-image area the resulting composite picture is spoiled by seams as shown in FIG. 1a. What is worse, it is likely to cause a fatal wrong communication of data.

In order to solve the problems mentioned above, there are proposals which are disclosed in Japanese Laid-Open Patent Publication Nos. 63-250680 and 63-175882. FIG. 2 shows the display device shown in the 63-250680 Publication. This device includes optical fiber bundles 15 to 18 disposed in correspondence to picture elements in minor screens 11 to 14. The optical fibers are individually connected to the minor screens 11 to 14 at one end each thereof, and the other ends are bundled so as to constitute a major screen 10. The 63-250680 Publication discloses a similar type of display device.

However, because of the spaces among the screens 11 to 14, a misalignment is likely to occur between the major screen 10 and the minor screens 11 to 14. This necessitates the bending of the optical fibers at portions 15 to 18, which causes the following problems:

As shown in FIG. 3, if the optical fibers 19 having the same length and a diameter of d are bent at an angle $\theta$ at portions 19a equally distant from one end each thereof, the bending of the optical fibers causes a deviation of $d \times \tan(\theta/2)$ between the outside corner 19b and the inside corner 19c. More specifically, in the drawing, the inside corner 19c rises above the outside corner 19b by $d \times \tan(\theta/2)$. With this situation, if the optical fibers are consecutively stacked, the bent portions 19a shift upward. This causes misalignment in the ends of the optical fibers 19. The misalignment of the optical fiber ends must be made up for by filling in the gaps or by prolonging the short optical fibers until all the ends are evenly aligned. As a result, the length L' between the minor screens 1a and the major screen 20 in FIG. 4 is disadvantageously prolonged.

SUMMARY OF THE INVENTION

The liquid crystal display panel of this invention, which overcomes the above-discussed and numerous other disadvantages and deficiencies of the prior art, includes at least two display devices each having screens, an optical fiber bundle connected to the respective screens so as to transmit an image therethrough, wherein the optical fiber bundle comprises optical fibers arranged side by side and fastened to each other to take the form of a letter Y having a straight portion and branch portions, the straight portion being perpendicularly connected to an output end face, and the branch portions being connected to an input end face, and spacers interposed between adjacent optical fibers in a portion of the bundle at least toward the output end face.

In a preferred embodiment, the optical fibers have a core whose refractive index is an even step index type, and whose numerical aperture is not smaller than the angle of expansion of a light from picture elements.

In a preferred embodiment, a light transmissive plate is disposed on a face on which a composite image is formed by the optical fiber bundle.

In a preferred embodiment, the optical fibers have a core whose refractive index is an even step index type, and whose numerical aperture is not smaller than the angle of expansion of a light from picture elements, and further comprising a light transmissive plate disposed on a face on which a composite image is formed by the optical fiber bundle.

Alternatively, the liquid crystal display apparatus including three display devices each having screens, a first and a second display device being spaced from each other and their screens being on the same level, the third display device being located rearward of the first and second display devices toward the input side of the display apparatus and having a screen rearward thereof, and an optical fiber bundle interposed between the first and second display devices and connected to the screen of the third display device at the input end, and the output end face thereof being located between the screens of the first and second display devices so as to transmit an image therethrough, wherein the optical fiber bundle comprises optical fibers arranged side by side, fastened to each other, and bent so as to enable each end portion of the optical fiber bundle to be connected perpendicularly to the input and output screens, and spacers interposed between adjacent optical fibers in a portion of the bundle at least toward the output end face.

In a preferred embodiment, wherein the screens of the first and second display devices comprise light transmissive plates having a refractive index approximately equal to that of the cores in the optical fibers.

In a preferred embodiment, wherein the angle of expansion of light at the output ends of the optical fibers is approximated to that of each picture element.

In a preferred embodiment, wherein the angle of expansion of light at the output ends of the optical fibers is approximated to that of each picture element.

Thus, the invention described herein makes possible the objectives of (1) providing a liquid crystal display apparatus capable of forming a seamless composite picture from a plurality of display devices, and (2) providing a liquid crystal display apparatus capable of displaying a clear and bright picture on a large screen.

BRIEF DESCRIPTION OF THE DRAWINGS

This invention may be better understood and its numerous objects and advantages will become apparent to those skilled in the art by reference to the accompanying drawings as follows:

FIG. 10a to 10h are diagrammatic view showing the steps for fabricating the optical bundle shown in FIG. 9;

FIG. 12 is a front view showing another example of the present invention;

FIG. 13a is a schematic view exemplifying the state of a light when black resin is not used in the optical bundle;

FIG. 13b is a schematic view showing the state of a light when black resin is used in the optical bundle;

FIG. 17 is a perspective view showing a modified optical fiber;

FIG. 18a is a schematic view showing the relationship between the numerical aperture and the difference in refractive index between the core and the cladding of the optical fibers;

FIG. 18b is a schematic view showing the angle of expansion of the light from picture elements;

DESCRIPTION OF THE PREFERRED EMBODIMENTS

Figure 1A:
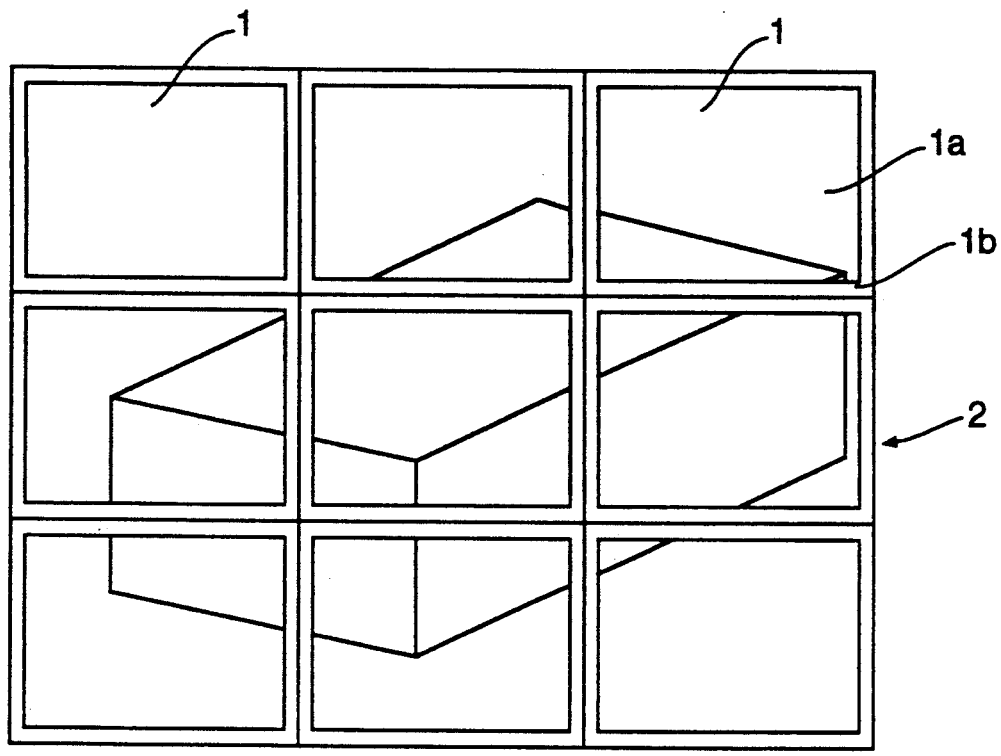
FIG. 1a is a front view showing a plurality of screens used in a conventional liquid crystal display apparatus.
Figure 1B:
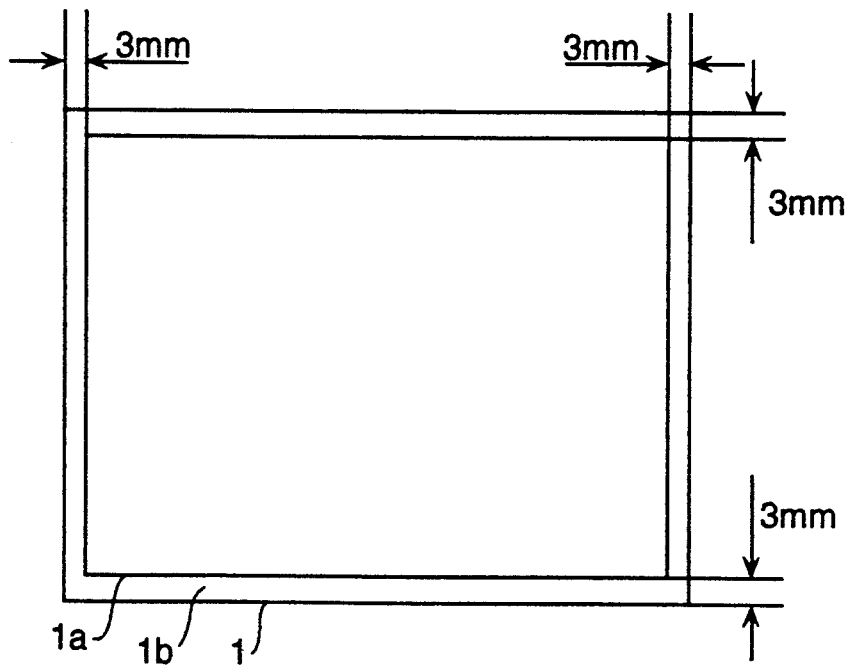
FIG. 1b is a front view showing one of the screens.
Figure 2:
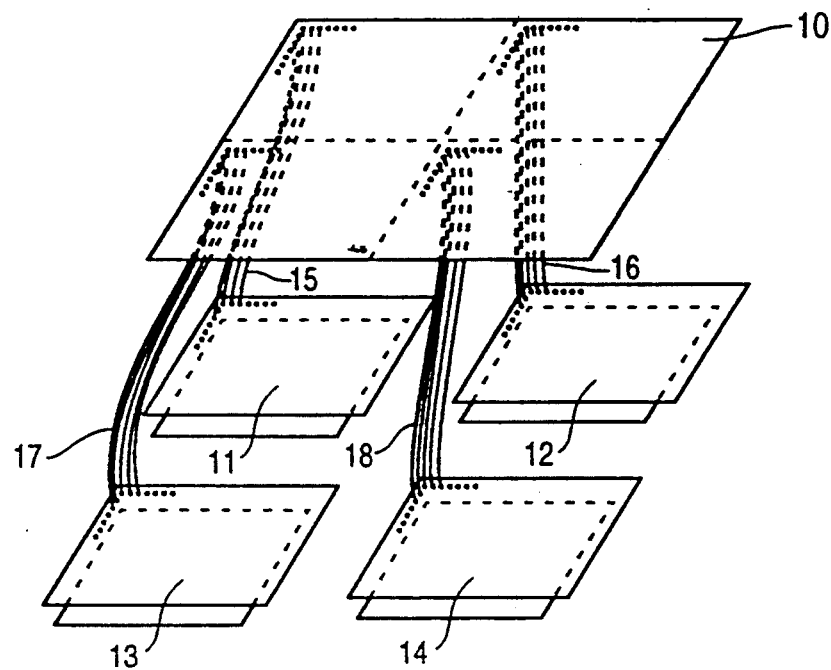
FIG. 2 is a perspective view showing a liquid crystal display apparatus with a conventional structure using optical fibers.
Figure 3:
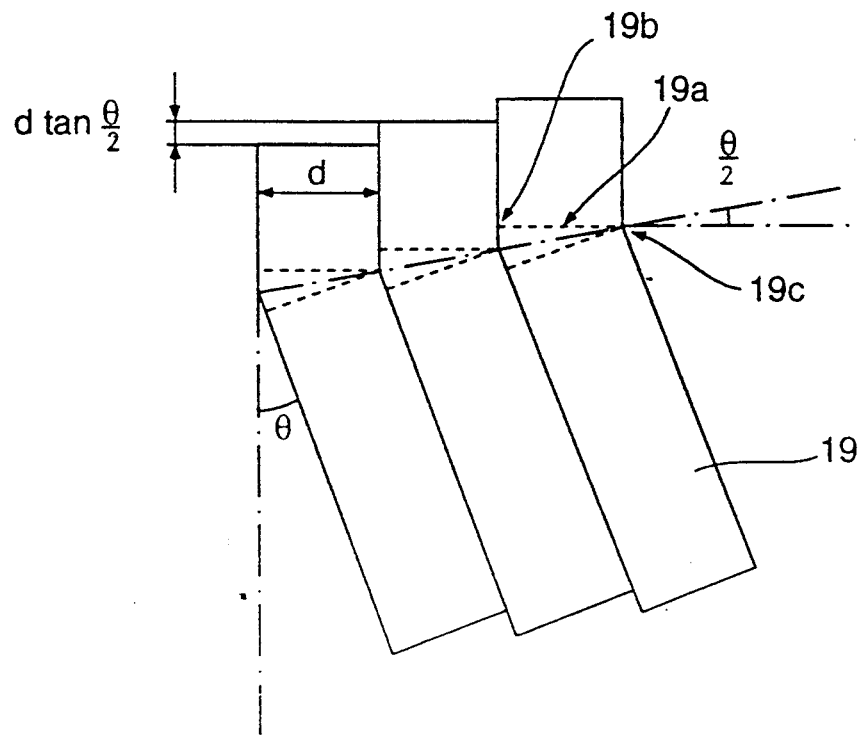
FIG. 3 is a schematic view exemplifying a problem of the conventional liquid crystal display apparatus shown in FIG. 2.
Figure 4:
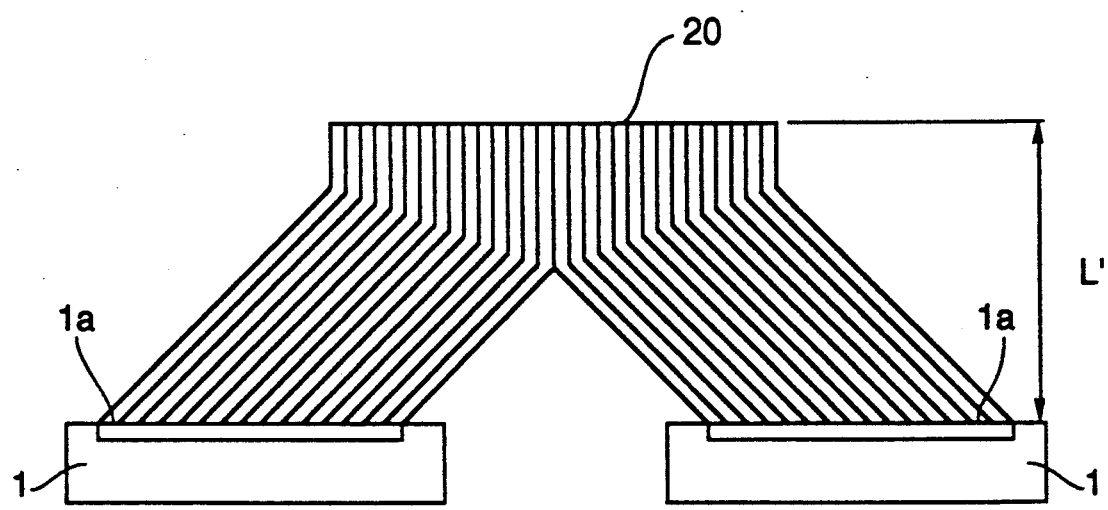
FIG. 4 is a schematic view explaining another problem of the liquid crystal display apparatus shown in FIG. 2.
Figure 5:
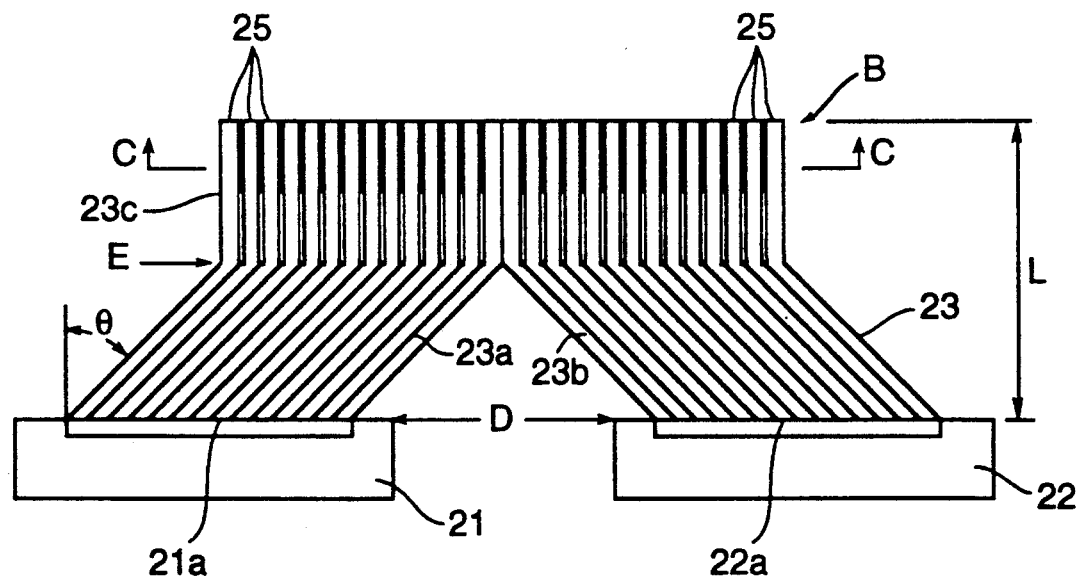
FIG. 5 is a front view showing a first example of the liquid crystal display apparatus according to the present invention.

Referring to FIG. 5, the liquid crystal display apparatus is provided with two liquid crystal display devices 21 and 22 but the number of display devices are not limited to two pieces. The display devices 21 and 22 are respectively provided with screens 21a and 22a which are horizontally aligned and face frontward. Each screen 21a and 22a has a display face D. An optical fiber bundle 23 is connected to the screens 21a and 22a. The optical fiber bundle 23 is separated into branch portions 23a (right field) and 23b (left field) at a plane E so as to take the form of a reversed letter Y. More specifically, the branch portions 23a and 23b are connected to the display face D of the respective screen 21a and 22a at an angle $\theta°$.

In this way the optical fiber bundle 23 takes the form of reversed Y, that is, branch portions 23a and 23b and a straight portion 23c where spacers 25 are inserted between adjacent optical fibers. The spacer 25 will be hereinafter described in detail. The other end of the optical fiber bundle 23 has a display face B which is formed with the aligned equally spaced ends of the optical fibers.

When the display devices 21 and 22 are driven through a driving circuit by split signals for the two fields, the pictures appearing on the screens 21a and 22a are displayed as a composite picture on the display face B without discontinuity. The picture quality is enhanced irrespective of the enlargement.

Figure 6:
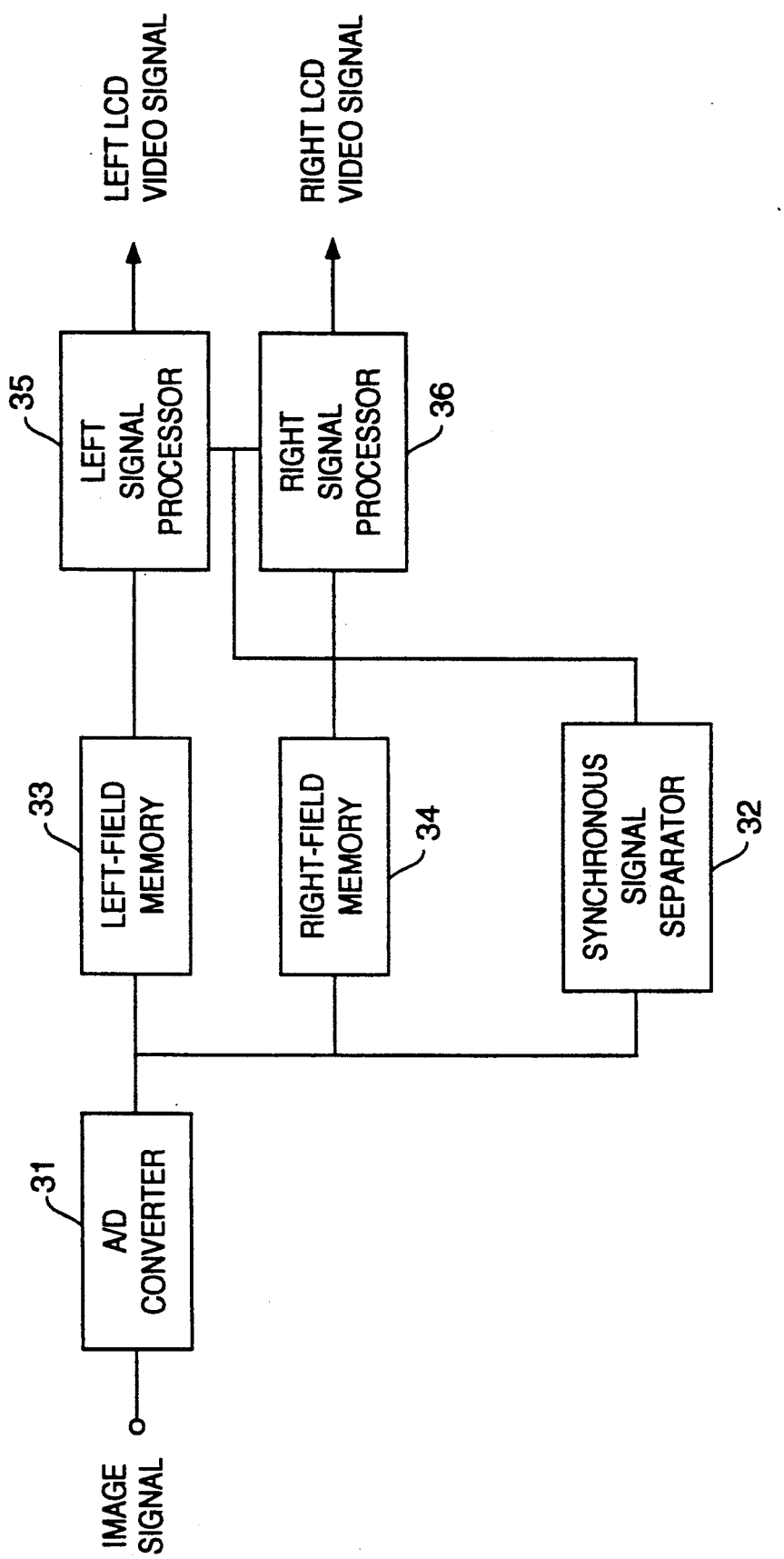
FIG. 6 is a flowchart showing a driving circuit used in the liquid crystal display apparatus shown in FIG. 5.

FIG. 6 is a block diagram showing a driving circuit for driving the display devices 21 and 22. The circuit includes an A/D converter 31 to which an analog signal (image signal) taken by a solid photographing device (not shown) is applied, a synchronous signal separator 32 for separating a synchronous signal from an output of the A/D converter 31, and a left-field memory 33 for storing a signal applied to the left-field from the signal from the A/D converter 31, a right-field memory 34 for storing a signal applied to the right field, a left signal processor 35 and a right signal processor 36. The left signal processor 35 outputs a left LCD video signal to the display device 22 allotted to a one frame picture on the basis of the signals from the memory 33 and the separator 32. The right signal processor 36 outputs a right LCD video signal to the display device 21 allotted to the one frame picture on the basis of the signals from the memory 34 and the separator 32. Hereinafter, the LCD video signal will be referred to as the "video signal".

Figure 7A:
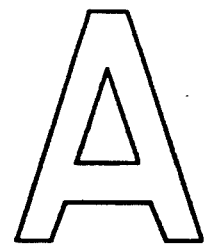
FIG. 7a to 7d are schematic views showing a signal processed by the driving circuit.
Figure 8A:
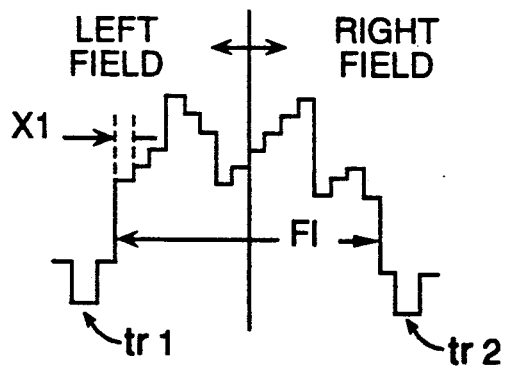
FIGS. 8a to 8f are diagrammatic views showing the steps for processing signals of the driving circuit.
Figure 8B:
Figure 8C:
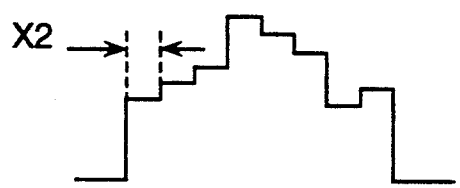

The operation of the driving circuit will be described by using an example in which image data is processed for a one frame picture:

In FIG. 7a, suppose that the illustrated letter A is a one frame picture to be displayed, and an image signal concerning this image A is input to the A/D converter 31 which in turn outputs an image signal shown in FIG. 8a. F1 shows a one field portion. Synchronous signals tr1 and tr2 are separated from the output of the A/D converter 31 by the separator 32 as shown in FIG. 8b.

Figure 8D:
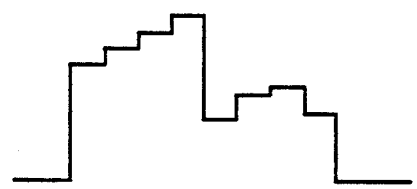
Figure 8E:
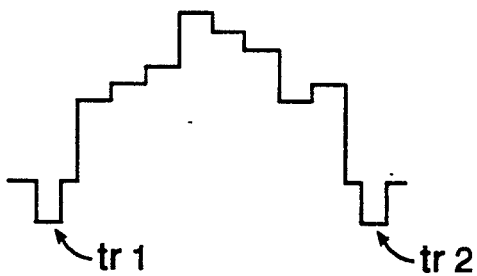
Figure 8F:
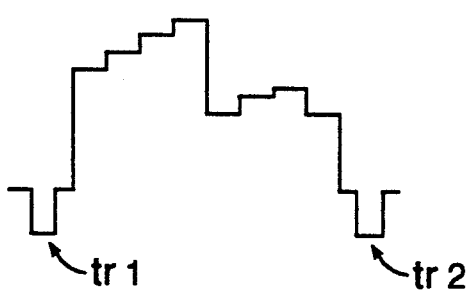

The half of the remaining picture portion allotted to the left field is enlarged by expanding the picture width X1 in FIG. 8a to the width X2 so as to be fully displayed on the whole screen 22a, and stored in the left-field memory 33. The other half of the remaining picture portion allotted to the right field is likewise enlarged as shown in FIG. 8d, and stored in the right-field memory 34.

Afterwards, the left signal processor 35 mixes the signal from the memory 33 and the synchronous signals tr1 and tr2 separated by the separator 32, and outputs a left field image data as a left video signal. At the same time, the right signal processor 36 mixes the signal from the memory 34 and the synchronous signals tr1 and tr2 separated by the separator 32, and outputs a right field image data as a right video signal.

Figure 7B:
Figure 7C:
Figure 7D:
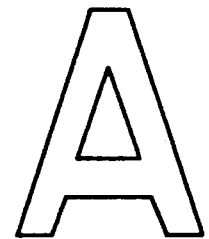

The display device 22 (left picture use) displays a left portion of the intended picture A (FIG. 7b) in response to the left video signal, and the display device 21 (right picture use) displays a right portion of the intended picture A (FIG. 7c) in response to the right video signal. The picture displayed by the display devices 22 and 21 is transmitted to the display face B through the optical fiber bundle 23. The seamless composite picture A is displayed on the display face B as shown in FIG. 7d.

Figure 9:
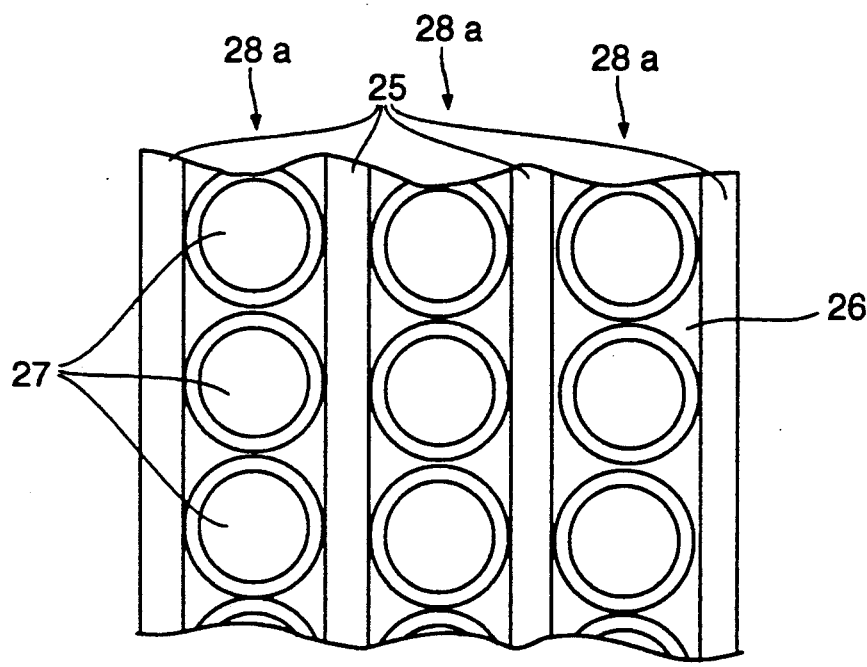
FIG. 9 is a sectional view showing an optical fiber bundle used in the liquid crystal display apparatus in FIG. 5.

The optical fiber bundle 23 will be described in detail by reference to FIG. 9 to 11:

The optical fiber bundle 23 takes the form of reversed letter Y as shown in FIG. 5, and is provided with the spacers 25 inserted between the adjacent optical fibers so as to maintain proper gaps therebetween. FIG. 9 shows a cross-section of each optical fiber 27. As shown in FIG. 9, an appropriate number of optical fibers 27 are arranged side by side in a row, and an appropriate number of rows are arranged with the spacers 25 interposed therebetween. The rows are referred to as optical fiber bands 28a below. The spacer 25 is made from a sheet material. The reference numeral 26 denotes black paint packed in the gaps so as to shield light.

The optical fiber bundle 23 can be fabricated as follows:

In FIG. 10 an appropriate number of optical fibers 27 are arranged side by side and bonded to each other so as to form a single sheet-like integer, hereinafter referred to as the "sheet 28". This sheet 28 is cut to a desired width W1 and length W2 as shown in FIG. 10b. The tape-like spacers 25 are bonded at equal intervals on one side of the sheet 28 as shown in FIG. 10b. The width W1 is determined so as to be equal to that of the screens 21a and 22a of the display devices 21 and 22.

Then, the optical fiber bands 28a are obtained from the sheet 28 by cutting the sheet 28 into optical fiber bands 28a each having the spacers 25 along one edge thereof as shown in FIG. 10c. As referred to above, the optical fiber bands 28a constitutes the rows. Then, as shown in FIG. 10d, the optical fiber bands 28a are bent at a predetermined distance from the end. The bent optical fiber bands 28a are stacked into a block 30 as shown in FIG. 10e. The length W3 of the block 30 is equal to that of the screens 21a and 22a.

Figure 10F:
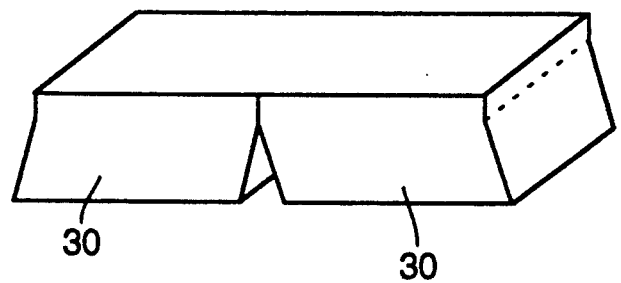

Two blocks 30 are prepared, and joined to each other as shown in FIG. 10f, wherein the optical fiber bands 28a are releasably bonded to each other under the bonding force of the adhesive used in forming the sheet 28. The spacers 25 are firmly bonded with a suitable adhesive referred to below.

Figure 10G:
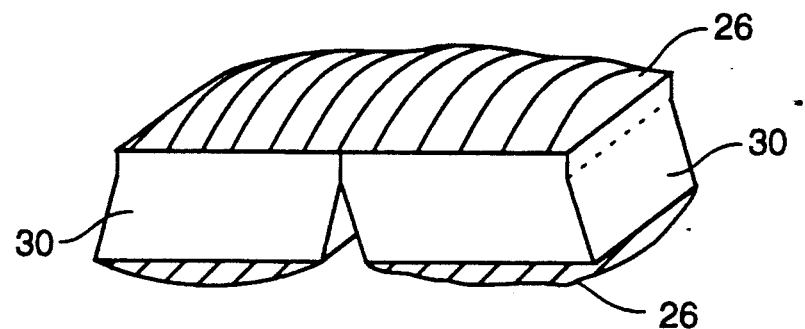
Figure 10H:
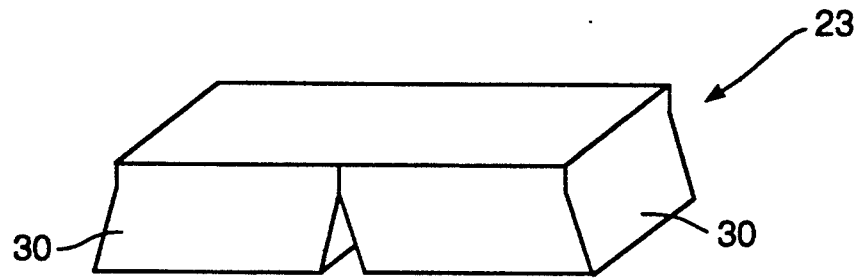
Figure 11A:
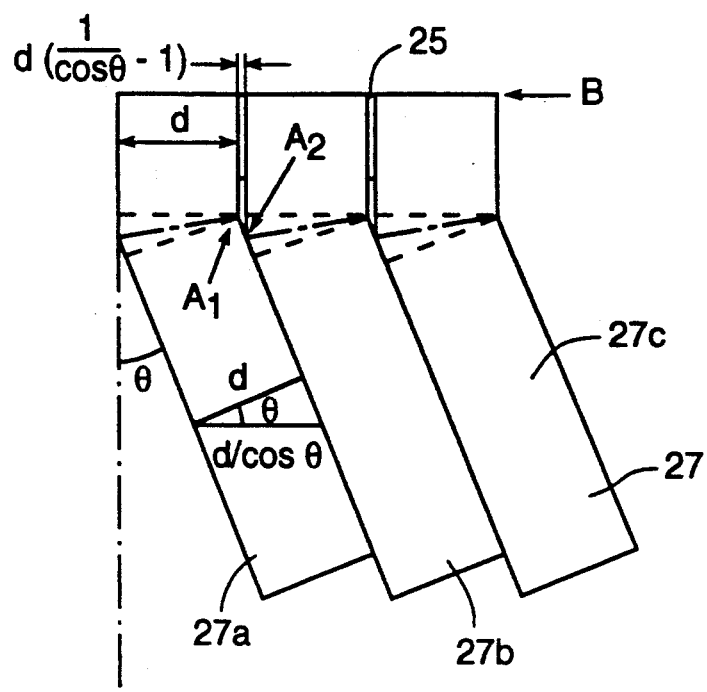
FIG. 11a and 11b each are fragmentary views on an enlarged scale showing examples of the optical bundle.

Then, as shown in FIG. 10g, the black resin 26 is filled in the gaps present in the blocks 30. The black resin is made of epoxy resin, for example. The black resin absorbs any light which otherwise would be likely to enter adjacent optical fibers, and cause detrimental light interference. The advantage of the black resin will be described in greater detail below. Finally, as shown in FIG. 10h, each top face is flatly cut to form the display faces B and D. In this way, the optical fiber bundle 23 is finished. The advantages of this optical fiber bundle 23 are (1) that a seamless picture is displayed on the display face B and (2) that the length L can be shortened. The reason why the length L can be shortened is explained as follows:

In FIG. 11a, each branch portion 23a and 23b of the optical fiber bundle 23 is expanded more widely by an angle $\theta$ than the straight portion 23c. As a result, the optical fibers of the branch portion 23a and 23b have a longer diameter by $(d/\cos \theta)$ than that of the straight portions. Because of this difference between d and $(d/\cos \theta)$ planar gaps occur in the display face B. The planar gap has a thickness of $d(1/\cos \theta - 1)$. According to the present invention, the spacers 25 fill in this gap, thereby allowing the disaccord between the bent point $A_1$ of the left optical fiber 27a and $A_2$ and the bent point $A_2$ of the central optical fiber 27b. Thus the length L can be shortened with the ends of the optical fibers 27 aligned on the same plane. It is preferred that the curvature is as small as possible so as to shorten the length L. In the drawing the bent optical fibers 27 are represented in straight lines, but actually they are bent along smooth curved lines.

The values of the length L depend upon many factors; for example, when the interval between the display devices 21 and 22 is 20 mm, the optical fiber bundles 23 are bent at an angle of 20°, and the screens 21a and 22a have a diameter of 20 inches, it is 32.5 mm under the present invention. Under the same conditions, the length L will be 83.0 mm under the conventional structure. When the screens 21a and 22a have a diameter of 30 inches, the length L is 32.5 mm according to the present invention in contrast to 108.3 mm under the conventional structure.

Figure 11B:
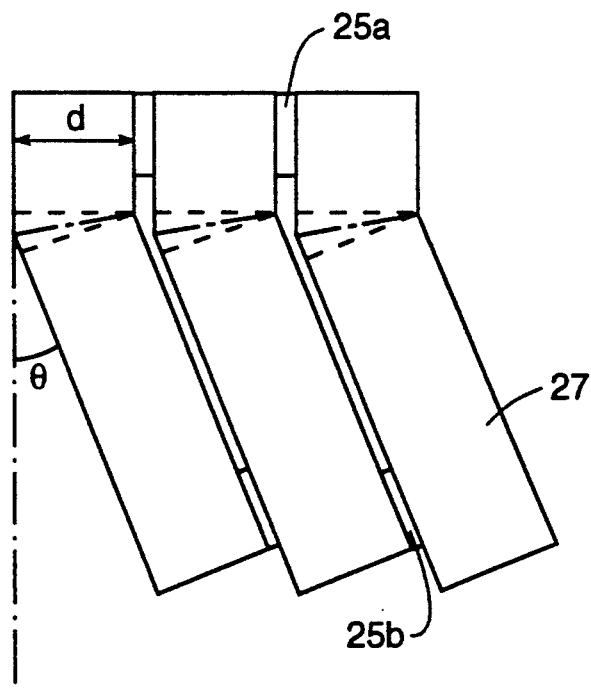

When the fabrication of the spacers 25 having the same thickness as that of the planar gaps is difficult, especially when the extremely thin spacers are to be fabricated, two spacers 25a and 25b are provided on the parts of the display faces B and D as shown in FIG. 11b, with the difference between the thicknesses of the spacers 25a and 25b being equal to the size of the planar gaps. The elasticity of the spacers 25, 25a and 25b can be taken into consideration if they are made of elastic material.

The spacers 25, 25a and 25b are made of tough, workable and machinable material which can be used when the thickness is less than 100 $\mu$m. For example, polyester, polyamide, polyethylene, polyethylene naphthalate, polypropylene, and acetate can be selectively used. In the illustrated example, polyester having a thickness of 25 $\mu$m was used.

EXAMPLE 2

Referring to FIG. 12, the optical fiber bundle 40 is twice bent in a plane E and a plane F each at an angle of $\theta$. The difference from Example 1 is that branch portions 40a and 40b are bent in the plane F, and connected to the screens 21a and 22a at a right angle. A straight portion 40c has the display face B.

Spacers 41 and 42 are provided at two places; that is, on the parts of the display faces B and D. In Example 2, the length L can be shortened, and the picture displaced on the display face B is seamless.

In Example 2, black resin is filled in the gaps. A greater advantage of black resin also results as shown in FIG. 13b as compared with a case where no black resin is used as shown in FIG. 13a. In that case, when a light a is introduced into the optical fiber bundle 40, a light component b passes through the optical fibers 27 but a light component c introduced at a large angle than the prescribed angle is likely to enter optical fibers other than those through which it was introduced. This causes light leakage, thereby impoverishing the picture quality.

In contrast, in FIG. 13b the light component c is absorbed in the black resin 26, thereby preventing detrimental light interference from occurring. The black resin is filled in the same manner and at the same places as in Example 1.

Figure 14:
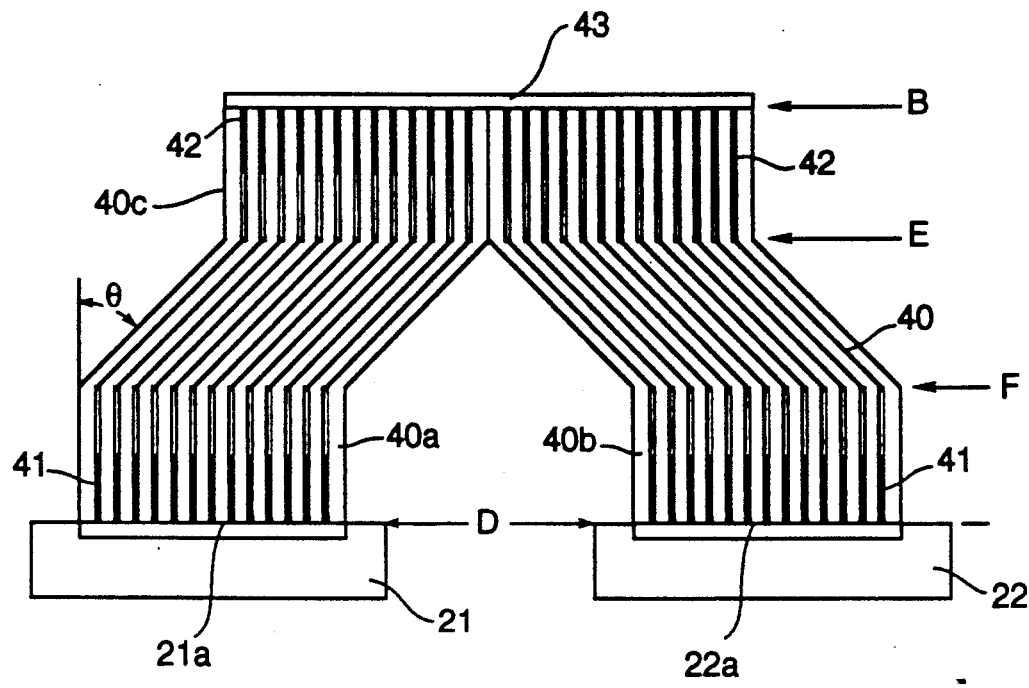
FIG. 14 is a front view showing a further example of the present invention.

The embodiment shown in FIG. 14 is provided with a transparent plate 43 such as glass panel adhered to the display face B, so as to enhance optical characteristics, and protect the display face B against dirt. Even if any dirt sticks to the display face B, it is readily cleaned on the transparent plate 43. The transparent plate 43 protects the display face B against mechanical shocks. When plastic-made optical fibers are used, the transparent plate 43 is especially useful for protecting the plastic optical fibers.

EXAMPLE 3

Figure 15:
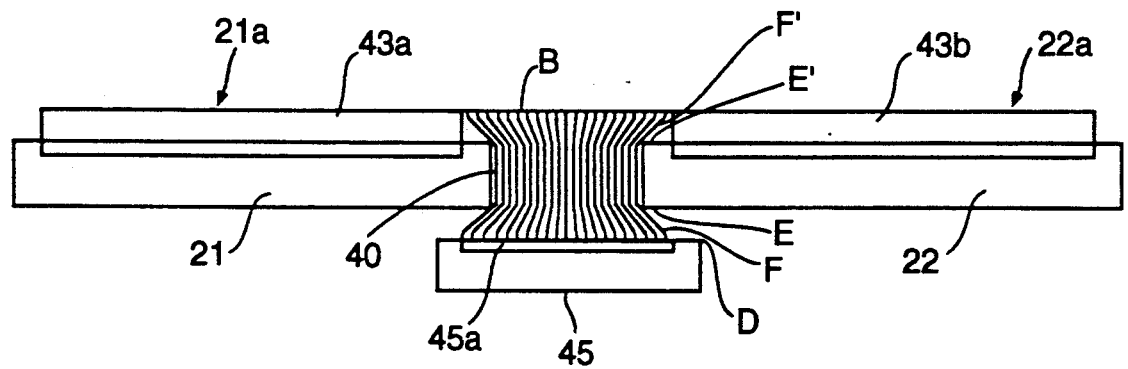
FIG. 15 is a front view showing a still further example of the present invention.

Referring to FIG. 15, a third example will be described:

This example is different from Examples 1 and 2 in that another display device 45 is provided between the display devices 21 and 22. The third display device 45 has a screen 45a. The picture which is formed on the third screen 45a is transmitted to an area in which no picture can be formed on the screens 21a and 22b by the display devices 21 and 22. The screens 21a and 22b include an ordinary screen inherently needed, and in addition to it, transparent plates 43a and 43b, respectively, which have surfaces on the same level.

The optical fiber bundle 40 has a special structure so as to increase the density of the optical fiber bundle in the narrow gap between the display devices 21 and 22. This special structure will be described as follows:

Basically, this optical fiber bundle 40 is constructed so as to be located in the narrow gap between the display devices 21 and 22. To achieve this, the bundle 40 is bent in planes E, E', F and F'. More specifically, as shown in FIG. 15, the optical fiber bundle 40 is first bent in a plane F below which the bottom end of the bundle is perpendicularly connected to the screen 45a. The bundle 40 is bent in two planes E and E' so that the portion between these two planes is converged so as to pass through the narrow gap between the display devices 21 and 22. The bundle 40 is again bent in a plane F' so that the top end of the bundle 40 is perpendicularly connected to the display face B. Spacers (not shown) are provided between the planes D and F, and between the planes F' and B. The description of the manner of providing the spacers is omitted for simplicity.

FIGS. 16a to 16f are timing diagrams showing the steps for processing the signals in the display apparatus according to the present invention.

Figure 16:
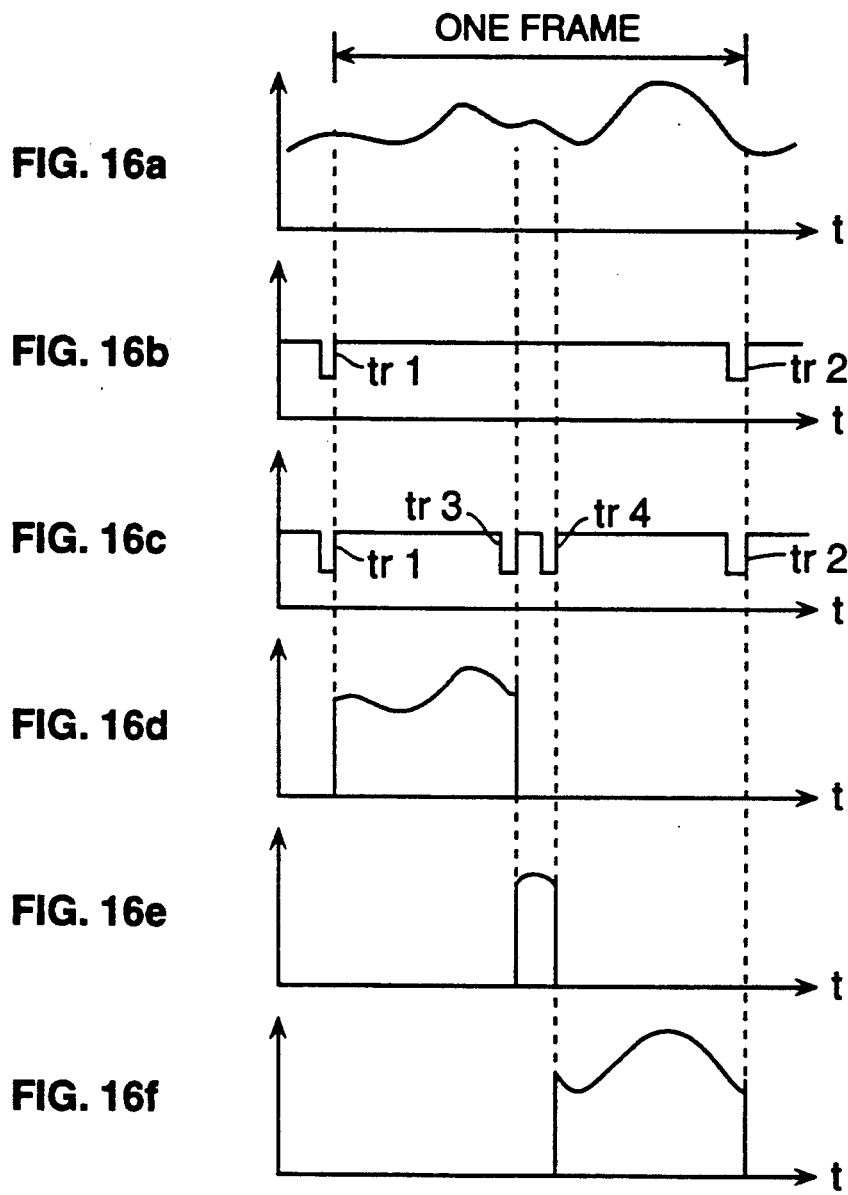
FIGS. 16a to 16f are diagrammatic views showing the steps for processing signals in the liquid crystal display apparatus in FIG. 15.

In FIG. 16a an image data obtained by a solid photographing device is input for one frame. Then as shown in FIG. 16b synchronous signals tr1 and tr2 are separated from the image data, and on the basis of the synchronous signals tr1 and tr2 further synchronous signals tr3 and tr4 are formed (FIG. 16c). These synchronous signals tr3 and tr4 divide the image data on an image to be transmitted to the display devices 21, 22 and 45. The synchronous signals tr1 to tr3 form an image data for the left field (FIG. 16d), and the synchronous signals tr4 to tr2 form an image data for the right field (FIG. 16f).

The image data for the left field is delivered to the display device 22, and an image data for the central field is delivered to the display device 45, and the image data for the right field is delivered to the display device 21. Thus a seamless picture is formed on the display face B.

FIG. 17 shows a modified configuration of an optical fiber suitable for use in Examples 2 and 3. This modified optical fiber 27 includes a stem portion, and thick portions 27a and 27b at the input end and the output end. The thick portions 27a and 27b can be round or elliptical.

FIG. 18 shows the structure and the optical characteristic of the optical fibers 27. In the example shown in FIG. 18a, the numerical aperture is shown in terms of a difference between refractive indexes of a core 27d and a clad portion 27e of each optical fiber 27. The numerical aperture is defined as sin ($\Phi/2$) by obtaining the value of $\Phi$, where the angle $\Phi$ is an incident angle at which a light is introduced into the optical fiber 27 from a light source such as display device 21 or picture elements. When this incident angle $\Phi$ is adjusted to be equal to the angle $\Phi$ in FIG. 18b or larger than it, the light of picture elements 46 is introduced into the optical fibers 27. Thus a bright and clear picture is displayed with good resolution.

As is evident from the foregoing description, When the angle $\Phi$ in terms of the numerical aperture is larger than an angle of expansion $\phi$ of a light from picture elements, any angular deviation at the input end face will be compensated, and is prevented from inflicting unfavorable influence on the resulting image. In the embodiment shown in FIG. 5 the branch portions 23a and 23b are slantly connected to the screens 22a and 23a but when the picture is viewed from the front, it is seen bright. In the embodiment shown in FIG. 15, when the angle $\Phi$ is equal to the angle of expansion $\phi$, the resulting pictures formed by the display devices and transmitted through the optical fiber bundle 40 have no seam or boundary, thereby obtaining a good quality composite image. In this case, the optical fibers are preferably an even step index type, that is, the cores thereof have an equal refractive index.

Figure 19:
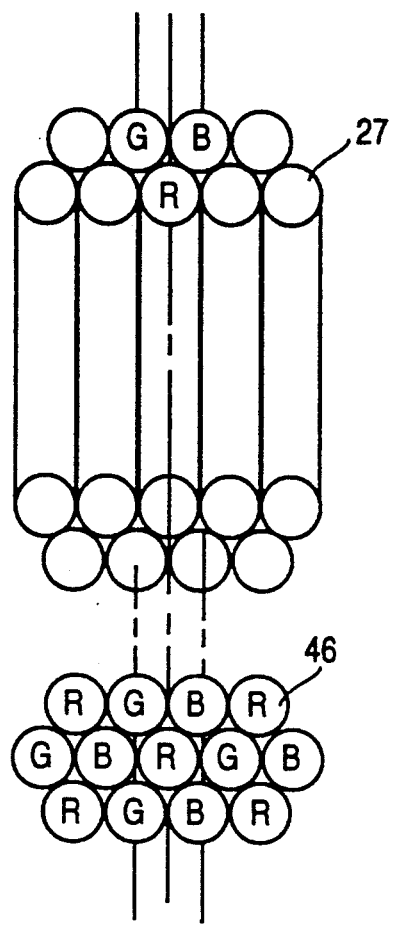
FIG. 19 is a schematic view showing an example for arranging the optical fibers in relation to the picture elements.
Figure 20:
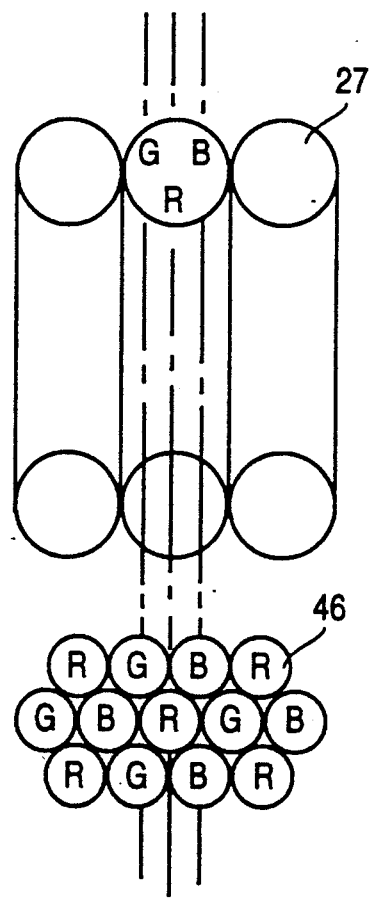
FIG. 20 is a schematic view showing another example for arranging the optical fibers in relation to the picture elements.
Figure 21:
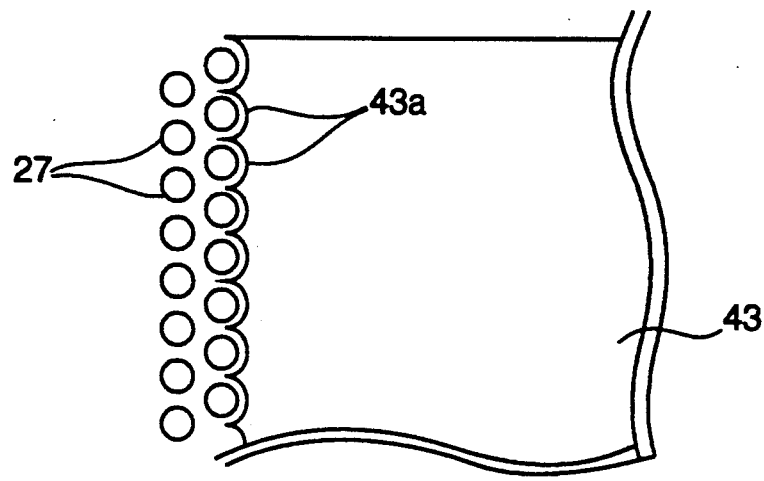
FIG. 21 is a schematic view showing an example in which a glass panel is used to facilitate the fixing of the optical fibers.

When the image is represented in color, the optical fibers are arranged for the picture elements in the following manner:

FIG. 19 shows an example in which each of picture elements 46 for red (R), green (G), and blue (B) is provided with a single optical fiber 27. FIG. 20 shows an example in which three picture elements for three colors, that is, red (R), green (G), and blue (B) are provided with a single optical fiber 27 so that lights from the three picture elements are transmitted through the single optical fiber 27. In this case, the arrangement shown in FIG. 21 is preferable. Under this arrangement a light is transmitted by the display device 21 through the optical fiber 27, and the picture elements whose image is to be displayed are made to correspond to the arrangement of the target picture elements, thereby enabling the boundary between the pictures to disappear. Thus a good quality composite picture is obtained. To achieve this, it is additionally required that the glass plate 43 is provided with grooves 43a in which the optical fibers 27 are secured as desired.

In the case of FIG. 21 it is not always necessary to locate the optical fibers 27 exactly at positions corresponding to the picture elements 46, because adjacent other optical fibers 27 compensate for any positional deviation between the optical fibers and the picture elements. Thus the occurrence of poor image quality is prevented.

The optical fiber can be more advantageously made of plastic than quartz, because of its inexpensive price, toughness, workability, anti-shock ability, light-transmissibility. In addition, a core having a minute diameter of 0.1 mm to 0.5 mm can be easily made in a plastic optical fiber.

The optical fiber bundle is fixed to the display faces B (the output end) and D (the input end) in various manners. A typical method is to fill resin in the gaps between the optical fibers arranged. When plastic optical fibers are used, the difference in coefficient of expansion between the filed resin and the optical fibers can be minimized, thereby avoiding the deformation of a display image due to changes in temperature.

It is preferable that the optical fibers have a cross-sectional area occupying 50% to 90% of the total opening of the optical fiber bundle. This is advantageous in the numerical aperture and a wide range of light expansion. It is also preferable that the optical fibers are fixed with the use of light-absorbent resin.

Figure 22:
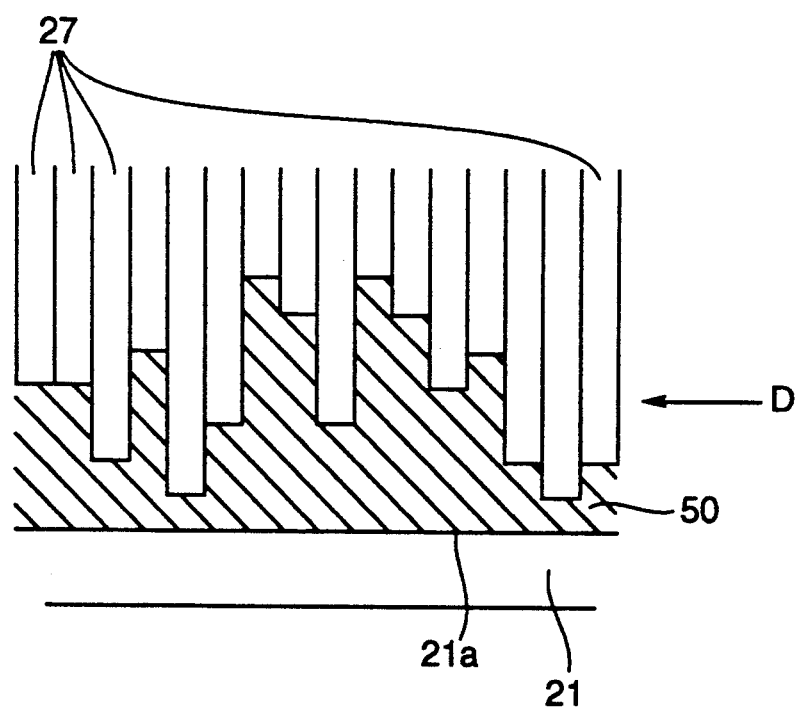
FIG. 22 is a sectional view showing a structure of the input end face formed by the optical fibers.

FIG. 22 shows an example which makes up for an uneven face D formed by variously terminating ends of the optical fibers 27, thereby maintaining the quality of a composite picture. The gaps occurring between the variously terminating ends of the optical fibers and the screen 21a and 22a are filled with a transmissive liquid 50 having a high refractive index. If the refractive index is n, the optical unfavorable influence can be reduced to 1/n. The selection of a liquid having a particular refractive index allows the control of the brightness of the picture as desired. The method of filling in the gaps with a liquid 50 reduces the burden to connect the optical fibers to the display device in an airtight manner. It is possible to apply pressure mechanically to the connection of the optical fibers and the display device but the screen and optical fibers are liable to breakage under the pressure.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A liquid crystal display apparatus including at least two display devices each having screens, an optical fiber bundle connected to the respective screens so as to transmit an image therethrough, wherein the optical fiber bundle comprises optical fibers arranged side by side and fastened to each other to take the form of a letter Y having a straight portion and branch portions, the straight portion being perpendicularly connected to an output end face, and the branch portions being connected to an input end face, and spacers interposed between adjacent optical fibers in a portion of the bundle at least toward the output end face.

2. A liquid crystal display apparatus according to claim 1, wherein the optical fibers have a core whose refractive index is an even step index type, and whose numerical aperture is not smaller than the angle of expansion of a light from picture elements.

3. A liquid crystal display apparatus according to claim 1, further comprising a light transmissive plate disposed on a face on which a composite image is formed by the optical fiber bundle.

4. A liquid crystal display apparatus according to claim 1, wherein the optical fibers have a core whose refractive index is an even step index type, and whose numerical aperture is not smaller than the angle of expansion of a light from picture elements, and further comprising a light transmissive plate disposed on a face on which a composite image is formed by the optical fiber bundle.

5. A liquid crystal display apparatus including three display devices each having screens, a first and a second display device being spaced from each other and their screens being on the same level, the third display device being located rearward of the first and second display devices toward the input side of the display apparatus and having a screen rearward thereof, and an optical fiber bundle interposed between the first and second display devices and connected to the screen of the third display device at the input end, and the output end face thereof being located between the screens of the first and second display devices so as to transmit an image therethrough, wherein the optical fiber bundle comprises optical fibers arranged side by side, fastened to each other, and bent so as to enable each end portion of the bundle to be connected perpendicularly to the input and output screens, and spacers interposed between adjacent optical fibers in a portion of the bundle at least toward the output end face.

6. A liquid crystal display apparatus according to claim 5, wherein the screens of the first and second display devices comprise light transmissive plates having a refractive index approximately equal to that of the cores in the optical fibers.

7. A liquid crystal display apparatus according to claim 5, wherein the angle of expansion of light at the output ends of the optical fibers is approximated to that of each picture element.

8. A liquid crystal display apparatus according to claim 6, wherein the angle of expansion of light at the output ends of the optical fibers is approximated to that of each picture element.

* * * * *